(No Model.)
H. WILLIAMS.
Process of and Apparatus for Manufacturing Grape Sugar.
No. 240,796. Patented April 26, 1881.
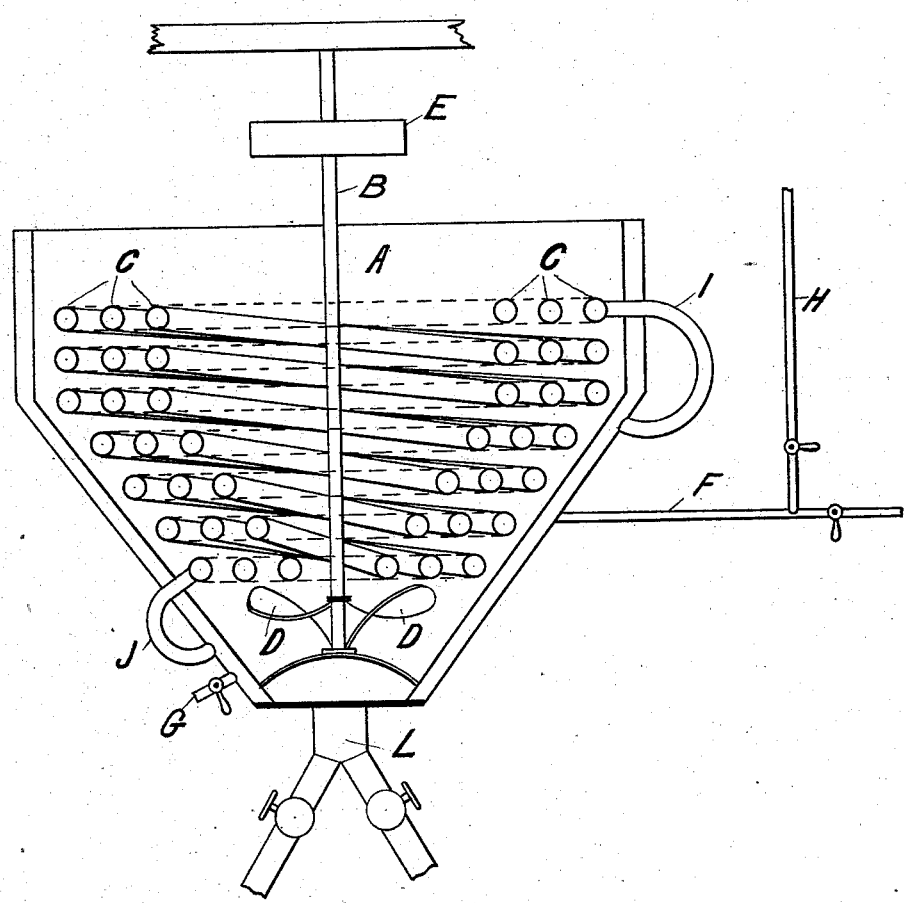
WITNESSES.
Harold M. Smith
Chas. O. Bulf
INVENTOR.
Horace Williams By
Amos Broadnax Atty.

UNITED STATES PATENT OFFICE.

HORACE WILLIAMS, OF BUFFALO, NEW YORK.

PROCESS OF AND APPARATUS FOR MANUFACTURING GRAPE-SUGAR.

SPECIFICATION forming part of Letters Patent No. 240,796, dated April 26, 1881.

Application filed December 6, 1880. (No model.)

*To all whom it may concern:*

Be it known that I, HORACE WILLIAMS, of Buffalo, New York, have invented a new and useful method or process of treating glucose for the purpose of accelerating, perfecting, and improving its crystallization or conversion to what is styled "grape-sugar," and certain new and useful apparatus to be used in the practice of said method or process; and I do hereby declare the following to be a description of said process and of said apparatus in such full, clear, concise, and exact terms as to enable any one skilled in the arts to which my invention appertains, or with which it is most nearly connected, to make and use said apparatus and practice said process, reference being had to accompanying drawing, making part of this specification, and to the figures and letters of reference marked thereon.

Said drawing illustrates a vertical section through said apparatus, and will be readily understood by the reference figures and letters hereinafter referred to.

In the manufacture of grape-sugar it is important to obtain the sugar pure, to quickly cool the concentrated sirup, and to obtain a rapid crystallization of uniform fineness.

Previous to my invention the practice was to draw the concentrated glucose out of the vacuum-pan into suitable vessels, tubs, or barrels, and allow it to stand in a state of quiescence until crystallization ensued, the whole mass gradually cooling and hardening, first around the edges or outside, and then through the mass unequally, forming large crystals or lumps in one part, fine granules or crystals in another, and in places leaving the sugar soft or uncrystallized, the unconverted dextrine or sirup settling in places and preventing uniform crystallization. This method of treating the converted sirup was very objectionable on account of the time taken in cooling, the space occupied in storing, the liability of the packages to leak, the want of perfect and uniform crystallization, and the liability of fermentation in the packages.

My invention overcomes these objections. It begins to deal with the sirup as soon as it is drawn from the vacuum-pan.

It consists of the following manipulation, viz: I draw the sirup from the vacuum-pan into an open tank of any suitable construction, but preferably cylindrical in form, with straight sides and a conical lower end or bottom, and with or without a jacket, as may be preferred. In this tank a coil of pipe is fitted, through which cold water is constantly circulating to carry off the heat of the mass. In this tank I also fit an agitator of any suitable form, but preferably of the form of a propeller, upon a shaft fitted with a pulley or gearing by which it can be rapidly rotated. This being done, I take dry powdered grape-sugar, equal to about one per cent. of the mass to be crystallized, and mix it in water sufficient to form a creamy mass of grape-sugar and water thin enough to run freely out of the containing-vessel into the tank containing the sirup to be crystallized. I now put the agitator in motion and pour in the solution of grape-sugar and water, and continue the agitation and cooling until the whole mass has thickened and crystallized far enough to insure a perfect and uniform crystallization of the entire mass, taking care to draw it out of the tank before it becomes too thick and hard to run freely into the barrels or other vessels placed under the tank to receive it. Now, by this treatment it will be seen that I artificially cool the concentrated sirup, that I artificially agitate it, and that I artificially induce and aid its crystallization, and by it I obtain a thorough crystallization of uniform fineness through the entire mass. I save the loss of time in cooling the room for storage, and the liability of leakage and fermentation.

The drawing illustrates an apparatus suitable for the purpose; but I do not intend to confine my invention, or the patent of which this is the specification, to the particular form or combination of apparatus in the practice of the process, for although this apparatus is new and well adapted for use in the process, others may be devised that will accomplish the same result.

Reference being had to the drawing, this apparatus consists of an open double-walled tank, A, having a conical bottom, substantially as shown. In this tank a shaft, B, is set upon a suitable journal-bridge in the bottom of the tank, the upper end of the shaft being supported above the tank and fitted with a pulley or cog-wheel, E, to rotate the shaft. The lower part of the shaft is fitted with an agitator, D, having oblique wings, similar to a screw-propeller. The inside of the tank is fitted with a coil of pipe, C, the end I of which communicates with the water-space between the walls of the tank, and the end J of which projects through the wall of the tank to the outside thereof. To the outside of the tank is applied a water-pipe, F, and a steam-pipe, H, communicating with the space between its walls, as does also a waste-water lock, G, near to the bottom, as shown. To the inverted apex of the tank is fitted a pipe, L, having two or more branches, each of which is fitted with suitable cocks or valves, through which the crystallized sugar is delivered into the desired receiver.

Operation: The concentrated sirup is drawn from the vacuum-pan directly into the tank A, water is admitted into the jacket through the pipe F, and passes from thence into the coil at I and out at J, carrying with it the heat of the sugar. The agitator in the meantime being in motion, and the creamy mixture of grape-sugar and water being added, the result is a rapid and thoroughly uniform cooling and crystallization of the mass, yielding the advantages above described.

The apparatus is readily cleaned by drawing the water out of the jacket and coil, and by admitting steam to them through the pipe H, by which the sugar is quickly melted off of the coil and the inside of the tank.

In this process the sugar will crystallize during the agitation without the addition of the grape-sugar, but not so rapidly or so well. The addition induces and aids the crystallization, and is a desirable adjunct, but it is not a necessary part of the process, because the sugar will crystallize without it, though not so well.

Having thus described my invention, its object, and advantages, I claim and desire to secure by Letters Patent—

1. The process herein described of obtaining a thorough crystallization of uniform fineness through the entire mass, and of saving time in cooling, avoiding loss by leakage and liability of fermentation, consisting of artificially cooling and agitating the sirup after it leaves the vacuum-pan, substantially as described.

2. The process herein described of inducing and aiding the crystallization of the sirup, consisting of adding a creamy solution of grape-sugar and water, as described, during the agitation of the sirup while exposed to a cooling-surface, substantially as described.

3. In treating the concentrated sirup for the purpose of cooling and crystallizing it, an apparatus consisting of a tank fitted with an agitator to thoroughly agitate the sirup, and with cooling pipes or surfaces to carry off the heat and aid in cooling it, substantially as described.

HORACE WILLIAMS.

Witnesses:
JOHN L. ALBERGER,
F. S. MILLER, Jr.